May 9, 1967 R. S. STONE ETAL 3,318,063
BUILDING INSULATION
Filed May 26, 1964

INVENTORS
ROBERT S. STONE,
D. GIFFORD WILCOX.
& CHARLES J. McBRIDE
By: Philip D. Golrick
ATT'Y.

United States Patent Office 3,318,063
Patented May 9, 1967

3,318,063
BUILDING INSULATION
Robert S. Stone, Shaker Heights, D. Gifford Wilcox, Tallmadge, and Charles J. McBride, Chagrin Falls, Ohio, assignors to The Cleveland Fabricating Company, Inc., Cleveland, Ohio, a corporation of Ohio
Filed May 26, 1964, Ser. No. 370,319
13 Claims. (Cl. 52—404)

The present invention relates generally to building insulation of the type comprised of a body of insulating material and a facing, and more particularly to improvements in insulation of this type including in the facing a reticulated reenforcing such as open webbing, scrim or the like. Since the invention is applicable also in insulation for air ducts and pipes, as well as that included in walls, roofs and other structural space enclosing parts, these and the like types of insulation are included in the term "building insulation" as here used.

For many years as a building material, insulating blankets of fibrous inorganic material, such as fiber glass, rock wool or the like, have been provided in the form of batts or strips of standard widths suitable for placement between studding, rafters, joists or other building framing components; and having on at least one side a facing serving as a vapor barrier, as means for partial support of the insulation blanket in place in the building structure and in many instances also as the final exposed facing of a wall or the like in which an appearance as pleasing as possible is desirable. More recently, in addition to polyurethane plastics foamed in place in the building, or in structural panels, use of faced foam blankets or faced foam panels has been proposed.

The facing is usually adhesively bound to the fibrous blanket, and commonly extends beyond the blanket at one or at each longitudinal edge on the order of two inches to form an elongated lengthwise running flap or "tab." In a wooden frame building, for example, with two-tab insulation in a wall, the tabs overlap and are secured to the studs between which the insulation is placed, the tabs of adjacent insulating blankets being therefore in overlapped relation on an intervening stud to form a vapor barrier joint. The tabs are secured to the studs and to each other for example by stapling or at times by adhesive means, applied on the job site or present in the insulation as purchased by builders.

In other types of construction, for example, in metal frame structures, the longitudinal edges of the adjacent insulating blankets may be brought into abutment, with either a one-tab or a two-tab joint used to provide a continuous vapor barrier or support by the facing sheets so joined. Where the form of the insulation provides a tab along only one edge of the blanket, the tab then overlaps and is cemented to the facing along the untabbed edge of an adjacent blanket. With a two-tab form, the tabs are brought together and adhesively secured in face-to-face relation each folded inwardly between the blankets at right angles.

To maintain an effective vapor barrier over large areas so insulated, a good joint between the tabs or between the facings of adjacent blankets is required, for which purpose it is necessary that the overlapping or abutting facing material be straight, smooth and unwrinkled. Further it is desirable that the facing material have a certain dimensional stability and strength for support of the insulation, or at times to facilitate stretching without damage to aid in obtaining suitable joints and a smooth pleasing appearance.

For the facing various materials have been used such as synthetic plastic films, heavy tough paper, such as kraft paper, metal foils such as aluminum, or laminated sheets formed of two or more of these materials to obtain the characteristically desirable features of each at a low cost. To obtain strength and dimensional stability in the facing there have also been used further reenforcing web materials such as muslin or other scrim materials and particularly non-woven reticulated glass fiber scrims. The latter scrim is comprised of roughly parallel transverse fiber glass strands or threads and a set of longitudinal roughly parallel spaced strands, one set impregnated or coated with a hot melt adhesive such as asphalt or polyethylene as it is laid on the other to cause a bonding of the points of fiber contact upon cooling.

Particularly there has commonly been used, as a low cost and effective facing, a laminated structure comprised of aluminum foil or plastic film and kraft paper with a reenforcing fiber glass scrim sandwiched therebetween and secured together by a suitable adhesive, to which the fibrous insulating blanket in turn has been secured by a suitable adhesive with either the foil or the kraft exposed as the external surface, more commonly however, the aluminum or plastic being so exposed with the blanket adhering to the kraft. Because of the relative thinness of the threads, and wide spacing between the threads in the scrim, on the order, e.g., of ⅝ inch squares, actually large percentages of the area of the aluminum foil or film and kraft are bonded directly together, as is readily permitted by the ductility of the aluminum or plastic which in effect is pressed in about the scrim threads to contact the opposed kraft sheet. This results in a very definitely marked scrim pattern appearance in the face of the aluminum foil or film which in some cases preferably would be obviated where the foil is to be visible in the finished building. Also the patterned foil or film is the more readily scuffed or abraded along the thread ridges, a result detrimental to the vapor barrier.

With these prior laminated structures having the scrim sandwiched between two other sheets in the composite, especially in foil-scrim-kraft faced blankets, it has been found by the pertinent standard testing procedures of Underwriters' Laboratories, Inc. that thus far, despite the many manufacturers long engaged in the fabrication of such material, there has been no comparable foil-scrim-kraft blanket product receiving a test rating such as to be classed "non-combustible" under the standards established by the Committee on Fire Prevention and Engineering Standards of the National Board of Fire Underwriters.

In accordance with one feature of the present invention by a simple change in construction, namely by including a reticulated reenforcing such as scrim in the facing laminated structure as an external layer rather than a sandwiched layer, with the insulation material such as a blanket secured to the scrim side of the facing, that is a foil-kraft-scrim construction, it has been found quite surprisingly that the resulting product under Underwriters' Laboratories standard testing and rating system consistently obtains the Committee's "non-combustible" classification, with numerical designation for this characteristic of 25 or less.

This aspect of the invention of course is of considerable advantage in the increase in the safety of the building construction, and also from an economic point of view because of the lower fire insurance rates thereby applicable to the building. Also the location of the kraft paper between the foil and reenforcing minimizes or eliminates the pattern appearance on the outside surface with normal fabrication methods, but the pattern can be established if so desired.

In tab type insulation of this invention the scrim or like reenforcing is carried out into the tab region, and then in effect sandwiched between the lateral extension of the foil-kraft or other laminate or other vapor barrier sheet and a backing provided either by reflecting the front sheet material behind the reenforcing or by a separate strip, the backing in either case being adhesively secured through the reenforcing to the main front laminated sheet. The separate strip may be a carrier strip for joint adhesive, pressure sensitive or solvent activated, or a thermoplastic film hot extruded into place and self-adhesively bonded. This confers strength and a certain dimensional stability on the tab as well as additional increased strength over the entire structure and also helps minimize wrinkling not only generally but also at the joints by virtue of the anchoring of the scrim in the tab region, in contrast to leaving the reenforcing exposed.

Thus there is obtained in the overall structure a strong stable facing conducive to ease of installation with good joints, also an improved appearance in the external or exposed outside foil face, and furthermore an insulation structure—not only in inorganic fibrous blankets but also in foamed blankets or rigid foam panels—having greatly improved characteristics insofar as combustibility is concerned. These advantages are obtained at relatively low cost in contrast with prior insulation structures having comparable characteristics; and the insulation structure furthers in the ultimate building both construction economy and incorporation of factors favorable in fire insurance ratings.

Although the invention will hereinafter be described in terms of a detailed example incorporating an inorganic fibrous blanket, it is applicable also with rigid insulating bodies and also with organic insulating materials such as foam blankets or panels.

Other objects and advantages will appear from the following description and the drawings wherein.

Figure 1:
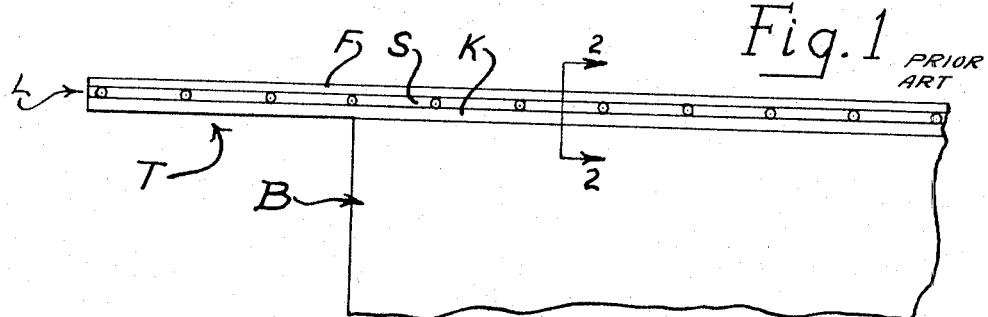
FIG. 1 is a fragmentary end view of a typical foil-scrim-kraft faced insulation structure showing a tab construction as typically appearing in the prior art.

In the drawings of course for clarity of representation the thicknesses of the laminated sheets and of the reenforcing threads are exaggerated, with no attempt to show proportions nor, except in FIGS. 2, 5, 6 and 7, the actual accommodation or distortion of the foil or of the fibrous material to the threads.

Figure 3:
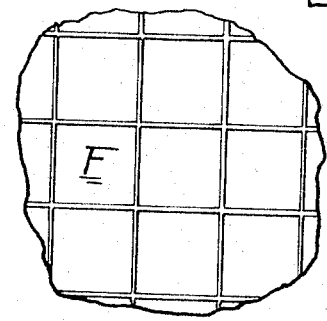
FIG. 3 is a fragmentary detailed view indicative of the scrim pattern appearing in an outside foil face in insulation in accordance with prior art.
Figure 2:
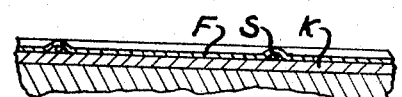
FIG. 2 is a much enlarged cross section of the laminated facing region of FIG. 1 taken at 2—2 in FIG. 1.

In FIGS. 1, 2 and 3 of the drawings there is shown a typical prior art insulation construction, comprised of a blanket B of fibrous insulating material, such as rock wool or fiber glass held together by a suitable binder in an insulating body, a laminated facing L extended laterally beyond the blanket to form a tab T along the blanket longitudinal edge.

As a typical "foil-scrim-kraft" construction the laminated facing L is comprised of an aluminum foil sheet F, a kraft paper sheet K and, sandwiched therebetween, a layer or "sheet" S of a reticulated reenforcing web material or scrim, bonded all together by suitable adhesive.

A low cost form of scrim is provided by a non-woven reticulated structure comprised of parallel longitudinal fibers or threads crossed at roughly right angles by similarly spaced parallel transverse fibers, secured at the crossing points by an adhesive and forming more or less square figures on the order of ⅝ of an inch on a side; although it is to be noted that in the final laminate frequently by distortion of the scrim locally or over wider areas the threads are displaced out of such parallel and right angular relations into rhomboidal or trapezoidal or other shapes; or the fibers instead of running closely parallel and at right angles to facing dimensions drifting off therefrom over considerable lengths or at least locally within the laminate.

In the prior art fabrication usually the laminate facing is first made up by standard lamination procedures by bringing say an aluminum foil and the kraft paper together with the web reenforcing or scrim sandwiched therebetween; an adhesive being used suitable for bonding the foil and kraft together, since the primary and effective bonding is achieved between these two components in the areas where they are actually pressed together primarily by deformation of the foil as shown in FIG. 2, and usually resulting in a marked pattern of the scrim appearing in the foil as shown in FIG. 3. Laminated facing of this character is generally commercially available to manufacturers of the building insulation material.

The fabricator of the insulation product then brings the insulation blanket in suitable strip form into combination with the laminated facing coated with a suitable adhesive effecting a bond between the blanket and the kraft face of the facing; the tab T as shown being formed by providing an excess in the facing width as required for one or two tab structure.

Figure 4:
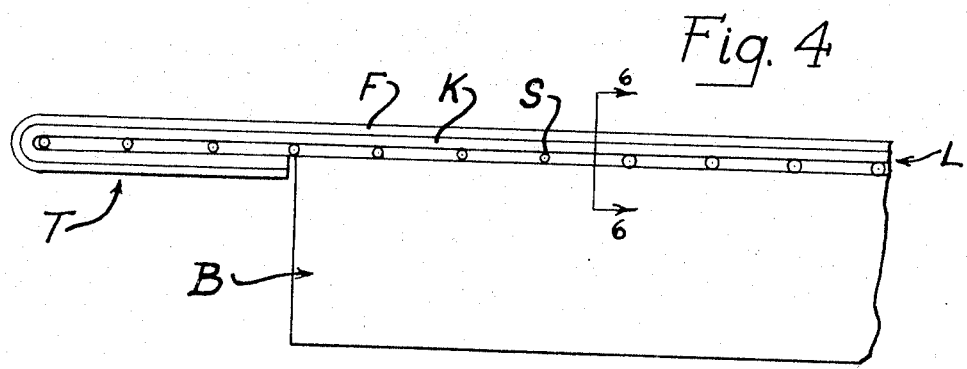
FIG. 4 is a fragmentary end view similar to FIG. 1, but showing insulation fabricated in accordance with the present invention.

A specific structure in accordance with the present invention is shown in FIG. 4 with the facing L, comprised of a film or foil F on a support sheet K and a reenforcing web or scrim S, to which is secured the body B of a thermal insulating substance.

As a specific example of materials, the foil F is an aluminum foil 0.00035 inch thick, and the kraft paper layer K is a 48-pound flame retardant kraft paper bonded together by a suitable adhesive into a laminated sheet, such a foil-kraft laminate being commercially available. The body B, for example, a 1½ inch thick Owen-Corning "Fiberglas" blanket of 0.6 pound per cubic foot density, and the reticulated reenforcing material S, such as 2020 scrim of Owens-Corning "Fiberglas," are brought together against the kraft back of the laminated sheet with an adhesive suitable for binding the "Fiberglas" blanket to the kraft. Generally a latex base water emulsion type adhesive is suitable for that purpose, for example the product of General Latex and Chemical Co., Ashland, Ohio, by them designated as 3S–716, applied to the kraft in a coating representing 1.5 grams per square foot on a dry basis.

Figure 6:
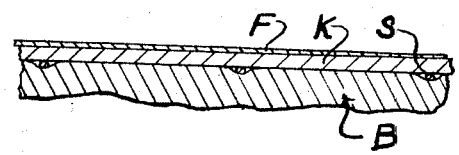
FIG. 6 is an enlarged and exaggerated fragmentary cross section of the region of blanket to laminated facing bonding taken at 6—6 in FIG. 4.

As the composite structure is brought together, the blanket, as shown in FIG. 6 is actually bonded directly to the kraft in the open spaces between the threads of the scrim web, serving as the primary means whereby the scrim is held locked in place between the laminate sheet and the blanket; although of course some direct adherence or cementing of the scrim to the kraft and to the glass is obtained.

However, where the body of insulating material is of a more or less rigid type, such as a so-called insulation board, elongated and of relatively thin but wide cross section, either the facing or surface region of the body may be deformed to bring into a preferred proximate relation the surfaces to be adhesively bonded. Where the facing is so deformed this of course brings the scrim pattern out markedly in the outer face often exposed to view in the building. This may be done, and so also where desired with a flexible blanket, by use of suitable pressures and rolls in the fabricating equipment.

Insulation fabricated in accordance with the present invention as above described having a foil-kraft-scrim facing and a fiber glass blanket of the weights and sizes above described, when subjected to the standard test procedures of Underwriters' Laboratories, understood to be in accordance with ASTM E84, achieved a flame spread rating such that the product is classifiable as "non-combustible" by the Committee standards.

The reenforcing could of course be laid in place as the vapor barrier sheet and the blanket are brought together in other ways; for example through feeding in spaced longitudinal strands or threads over which there are laid the cross strands, by dropping the latter successively onto underlying advancing facing sheet constituents, or by laying a continuous strand back and forth, perhaps in a zig-zag pattern across the product width.

Where a tab T is desired, the forward sheet part which includes the vapor barrier, such as the specifically named foil-kraft laminate, and the scrim extend beyond the longitudinal edge of the blanket at least the width of the desired tab, and a backing is provided for the scrim. In the FIG. 4 structure, the foil-kraft laminate projects beyond the scrim and is folded across the back of and secured to the scrim by the same adhesive used for bonding the blanket and facing. Although the kraft is not so readily deformable as foil, a sufficient adherence is readily obtained for sufficiently anchoring the scrim margin and retaining the tab together for convenient installation without too much care or effort to compress the tab. However, a firmer bonding in the tab region may be obtained merely by insuring application to opposite faces in this region of adequate pressure, particularly by yieldable roll means which would be more effective in deforming the kraft-foil laminate on one or both sides of the scrim or web in the tab region.

Figure 5:
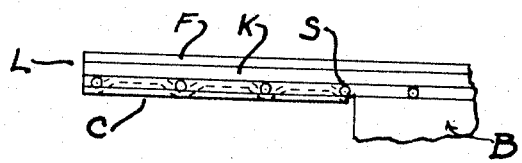
FIG. 5 is a fragmentary view similar to FIG. 4, but showing an alternative construction of the tab in accordance with the present invention.

As a modification in the tab structure, FIG. 5 shows the use of the commercially available foil-kraft laminate and the scrim S extending out the standard 2″ distance for a tab width, but with a separate piece C, distinct from the laminate, adhesively bonded over the scrim in the tab region to the kraft to secure the scrim in the tab region. This backing strip or piece C may as desired be kraft paper, plastic or aluminum foil or a laminate such as a foil-kraft laminate, as long as the layer C is readily bonded to the back of the facing. This structure at times may be useful where for some reason or other it is not desired to use an excess width of the foil-kraft facing sheet to be folded onto the back in the tab formation.

The material or backing C in FIG. 5 may also be a hot melt type adhesive, such as polyethylene or asphalt, serving to retain the scrim or other reenforcing against the kraft of the laminate structure, a hot melt type being advantageously used for ease of application by an applicator roll and ready setting without time requirement for solvent evaporation; or in the case of a polyethylene, the material can be extruded hot into place as the layer C with like effect.

Figure 7:
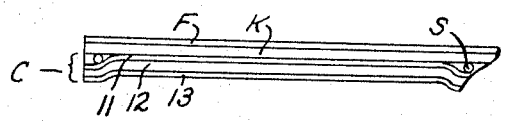
FIG. 7 is a further modification of FIG. 5.

Also to be noted is the case where the backing C assumes the form of a double-adhesive-faced adhesive carrier strip, as indicated in FIG. 7, where the two adhesive faces 11, 13 represent etiher adhesive coatings on, or the adhesive surfaces provided by an adhesive impregnating, the carrier strip 12, as in known commercially available types of pressure sensitive adhesive tape preferably having a strippable cover or backing layer, or the adhesive on one or both sides 11, 13 can be a solvent-activated adhesive. Such a form in structure C serves first the function of securing the scrim to the back faces of the kraft or other material at the back of the laminate, and also to provide a joint adhesive pre-coated on the tab, which in the first case is exposable for immediate use by pulling off the removable protective strip on the job site.

It is to be understood, of course, that in the drawing figures the components are not dimensionally proportionate, the represenations being, rather, schematic in form and having portions exaggerated in thickness or shape for clarity of representation.

The general structure above described with respect to FIGS. 4, 5 and 6 may also advantageously be used for reenforcing scrim where the insulating material B is a flexible foamed plastic blanket or a rigid foamed plastic "board" or the like; and blunt puncture resistance is thereby increased; or with other combinations than the aluminum foil-kraft-scrim arrangement, where for example the foil is a plastic film, such as vinyl bonded onto the kraft followed by the scrim and blanket. Or the arrangement could be kraft-foil-scrim with the blanket bonded thereto where again the foil could be a metallic foil or a plastic such as vinyl for example; or more generally the structure could be designated as an x-y-scrim facing with the blanket on the scrim side, with x and y being any of the materials useful in facing for this purpose; and in some cases merely an unlaminated vapor barrier sheet followed by reenforcing scrim.

Entirely apart from questions of tab construction, it is to be noted however that the placement of the scrim between the body of insulating material, whether a rigid "board" or a blanket, and the rest of the facing has the decided advantage of improving the rating of a given structure or set of components in contrast with that in which the scrim is included sandwiched between two other components of the laminated face.

We claim:
1. A building insulation comprising:
a fibrous inorganic insulating blanket,
a laminated flat facing applied to one face of the blanket, said facing comprising a plurality of sheets forming a laminated vapor barrier structure and a reenforcing scrim web interposed between said laminated structure and the blanket; said blanket being adherent to the back of the laminated structure through openings in the reenforcing web.

2. Insulation as described in claim 1, wherein said laminated sheet is comprised of an outer aluminum foil and a kraft paper sheet.

3. A building insulation comprising:
a fibrous inorganic insulating blanket,
a laminated facing applied to one face of the blanket, said facing comprising a plurality of sheets forming a laminated vapor barrier structure and a reinforcing web interposed between said laminated structure and the blanket;
said blanket being adherent to the back of the laminated structure through openings in the reinforcing web; and said insulation including a tab structure along at least one longitudinal blanket edge,
said tab structure comprising a marginal projection of the said laminated facing beyond the blanket edge and means providing backing on the underside of the tab overlying substantially all the projecting web and bonded through web openings to the laminated structure.

4. Insulation as described in claim 3, wherein in said marginal projection a portion of said laminated structure is longitudinally folded backwards to sandwich the projecting portion of the web therebetween to provide said backing.

5. In building insulation or the like including a body of insulating material of a regular shape and a facing; the improvement comprising:
said facing, as a layered facing on one face of the body, comprising a flat sheet-like structure providing a vapor barrier, and a reenforcing web interposed between said structure and the said body, said body being adherent to the back of the said structure through openings in the reenforcing web.

6. An improved fire-resistant building insulation comprising an insulation body having opposite major faces and having a substantial thickness between said major faces, and a substantially thinner flat vapor barrier facing having opposite outer and inner major faces, said facing having its inner major face bonded to one of said major faces of the insulation body, said facing having on its inner major face a reinforcing web of threads having spaces therebetween and directly adherently engaging said one major face of the insulation body through said spaces.

7. In building insulation or the like including a body of insulating material of a regular shape and a facing; the improvement comprising:

said facing, as a layered facing on one face of the body, comprising a sheet-like structure providing a vapor barrier and a reinforcing web interposed between said structure and the said body, said body being adherent to the back of the said structure through openings in the reinforcing web; and including a tab structure along at least one longitudinal body edge, said tab structure comprising a marginal projection of the said facing beyond the said edge, and means providing backing on the underside of the tab overlying at least the free edge of the projecting web and bonded through web openings to the sheet-like structure.

8. Insulation as described in claim 7, wherein in said marginal projection a portion of said sheet-like structure is longitudinally folded backwards to sandwich the projecting portion of the web therebetween to provide said backing.

9. Insulation as described in claim 7, wherein a thermoplastic material provides said backing and is self-bonded in consequence of application in a heated condition.

10. Insulation as described in claim 7, wherein said backing is provided by a double-adhesive-faced adhesive carrier strip, the adhesive on one face of the strip providing the bonding through web openings, and the adhesive on the other face a joint sealing adhesive.

11. Insulation as described in claim 10, wherein at least one of said adhesives is solvent activated.

12. Insulation as described in claim 10, wherein at least one of said adhesives is pressure sensitive.

13. Insulation as described in claim 12, wherein both said adhesives are pressure sensitive.

References Cited by the Examiner
UNITED STATES PATENTS

| | | |
|---|---|---|
| 2,172,048 | 9/1939 | Johnson. |
| 2,238,022 | 4/1941 | Johnson _____ 52—404 |
| 2,342,839 | 2/1944 | Byers _____ 52—406 X |
| 3,110,130 | 11/1963 | Trachtenberg _____ 52—404 X |
| 3,121,649 | 2/1964 | Oliver. |
| 3,222,237 | 12/1965 | McKelvy _____ 161—93 X |

HARRISON R. MOSELEY, *Primary Examiner.*

P. C. KANNAN, *Assistant Examiner.*